United States Patent
Brumm

(10) Patent No.: US 7,798,312 B2
(45) Date of Patent: Sep. 21, 2010

(54) COMPRESSION PASSING ROLLER

(75) Inventor: Christopher A. Brumm, Huntington, IN (US)

(73) Assignee: Shuttleworth, Inc., Huntington, IN (US)

( * ) Notice: Subject to any disclaimer, the term of this patent is extended or adjusted under 35 U.S.C. 154(b) by 685 days.

(21) Appl. No.: 10/541,168

(22) PCT Filed: Dec. 30, 2003

(86) PCT No.: PCT/US03/41519

§ 371 (c)(1),
(2), (4) Date: Jun. 29, 2005

(87) PCT Pub. No.: WO2004/060777

PCT Pub. Date: Jul. 22, 2004

(65) Prior Publication Data

US 2006/0070853 A1  Apr. 6, 2006

Related U.S. Application Data

(60) Provisional application No. 60/437,526, filed on Dec. 31, 2002.

(51) Int. Cl.
B65G 17/00 (2006.01)
B65G 17/24 (2006.01)
B65G 13/00 (2006.01)

(52) U.S. Cl. .................. 198/779; 193/37; 193/35 R

(58) Field of Classification Search .............. 193/37, 193/35 R; 198/779, 766
See application file for complete search history.

(56) References Cited

U.S. PATENT DOCUMENTS

| | | | |
|---|---|---|---|
| 1,299,198 A | 4/1919 | Low et al. | |
| 3,115,917 A | 12/1963 | Hertwig | |
| 3,376,965 A * | 4/1968 | Tregoning et al. | 193/35 R |
| 3,399,752 A * | 9/1968 | Orwin | 193/35 A |
| 3,669,246 A | 6/1972 | Risi | |
| 3,677,394 A | 7/1972 | Bloom | |
| 3,698,539 A | 10/1972 | Schwarzbeck | |
| 3,934,709 A | 1/1976 | Anikanov et al. | |
| 3,952,482 A * | 4/1976 | Quick | 56/13.9 |
| 3,976,177 A * | 8/1976 | Brown | 193/37 |
| 3,987,887 A | 10/1976 | Gentili | |
| 4,003,463 A | 1/1977 | Holt et al. | |
| 4,018,322 A * | 4/1977 | Brown et al. | 193/37 |
| 4,046,043 A | 9/1977 | Kistner et al. | |
| 4,195,960 A | 4/1980 | Schulze | |
| 4,236,855 A | 12/1980 | Wagner et al. | |
| 4,270,899 A * | 6/1981 | Faulkner et al. | 432/58 |
| 4,305,577 A | 12/1981 | Clay et al. | |
| 4,334,608 A | 6/1982 | Fabrig | |
| 4,372,201 A | 2/1983 | Dudziak et al. | |

(Continued)

FOREIGN PATENT DOCUMENTS

DE          2119633          11/1972

(Continued)

Primary Examiner—Gene Crawford
Assistant Examiner—Ramya Prakasam
(74) Attorney, Agent, or Firm—John V. Daniluck; Bingham McHale LLP

(57) ABSTRACT

Methods and apparatus for conveying a stack (22) of paper products by the use of rollers (50, 150, 250 or 350) that include lobed outer surfaces for contacting the stack of paper.

36 Claims, 14 Drawing Sheets

U.S. PATENT DOCUMENTS

| | | | |
|---|---|---|---|
| 4,405,122 A | 9/1983 | Faltin | |
| 4,437,658 A | 3/1984 | Olson | |
| 4,531,343 A | 7/1985 | Wood | |
| 4,545,715 A | 10/1985 | Seefeldt | |
| 4,572,350 A | 2/1986 | Besemann | |
| 4,610,593 A | 9/1986 | Voss et al. | |
| 4,717,013 A | 1/1988 | Reissmann et al. | |
| 4,750,853 A | 6/1988 | Van Soest et al. | |
| 4,753,339 A | 6/1988 | Vogt et al. | |
| 4,842,125 A | 6/1989 | Besemann | |
| 4,872,247 A | 10/1989 | Nakamura et al. | |
| 5,004,094 A | 4/1991 | Brandt | |
| 5,074,538 A | 12/1991 | Naumann | |
| 5,088,590 A | 2/1992 | Marschke | |
| 5,123,522 A | 6/1992 | Comly, Jr. | |
| 5,123,639 A | 6/1992 | Edwards | |
| 5,238,100 A | 8/1993 | Rose, Jr. et al. | |
| 5,330,045 A * | 7/1994 | Hodlewsky | 198/779 |
| 5,420,621 A | 5/1995 | Richtsmeier et al. | |
| 5,425,533 A | 6/1995 | Dronsfield | |
| 5,534,902 A | 7/1996 | Hoesly | |
| 5,615,873 A | 4/1997 | Kobayashi et al. | |
| RE35,844 E | 7/1998 | Crowley | |
| 6,042,102 A | 3/2000 | Raschke et al. | |
| 6,045,322 A | 4/2000 | Breysse | |
| 6,062,378 A * | 5/2000 | Clopton | 198/867.13 |
| 6,074,055 A | 6/2000 | Myung | |
| 6,113,344 A | 9/2000 | Crowley | |
| 6,148,322 A * | 11/2000 | Sand et al. | 718/103 |
| 6,148,989 A * | 11/2000 | Ecker | 198/387 |
| 6,148,991 A * | 11/2000 | Meishner et al. | 198/780 |
| 6,416,047 B1 | 7/2002 | Pfankuch | |
| 6,416,176 B1 | 7/2002 | Yasui et al. | |
| 6,516,940 B1 | 2/2003 | Hart et al. | |
| 6,527,501 B2 | 3/2003 | Wolf | |
| 6,571,937 B1 | 6/2003 | Costanzo et al. | |
| 6,582,140 B2 | 6/2003 | Kimura et al. | |
| 6,588,578 B1 | 7/2003 | Ernst | |
| 6,648,128 B2 | 11/2003 | Yamashita et al. | |
| 6,981,580 B2 * | 1/2006 | Meyer | 198/415 |
| 6,991,092 B2 | 1/2006 | Chojnacki | |
| 2001/0033764 A1 | 10/2001 | Kimura et al. | |
| 2002/0033570 A1 | 3/2002 | Crowley | |
| 2002/0084578 A1 | 7/2002 | Deutschle et al. | |
| 2002/0130014 A1 | 9/2002 | Antoniazzi et al. | |
| 2002/0139090 A1 | 10/2002 | Antoniazzi et al. | |
| 2003/0146065 A1 * | 8/2003 | Plesh, Sr. | 193/35 R |
| 2003/0160384 A1 | 8/2003 | Wolf | |

FOREIGN PATENT DOCUMENTS

| | | |
|---|---|---|
| DE | 2264161 | 9/1973 |
| DE | 2702724 | 9/1977 |
| DE | 19534499 A1 | 4/1996 |
| EP | 0149694 | 7/1985 |
| EP | 0336258 A2 | 10/1989 |
| EP | 0565456 | 10/1993 |
| GB | 2241931 A | 9/1991 |
| JP | 6115195 A2 | 4/1992 |
| JP | 10330005 A2 | 12/1998 |
| JP | 2000335802 A2 | 12/2000 |

* cited by examiner

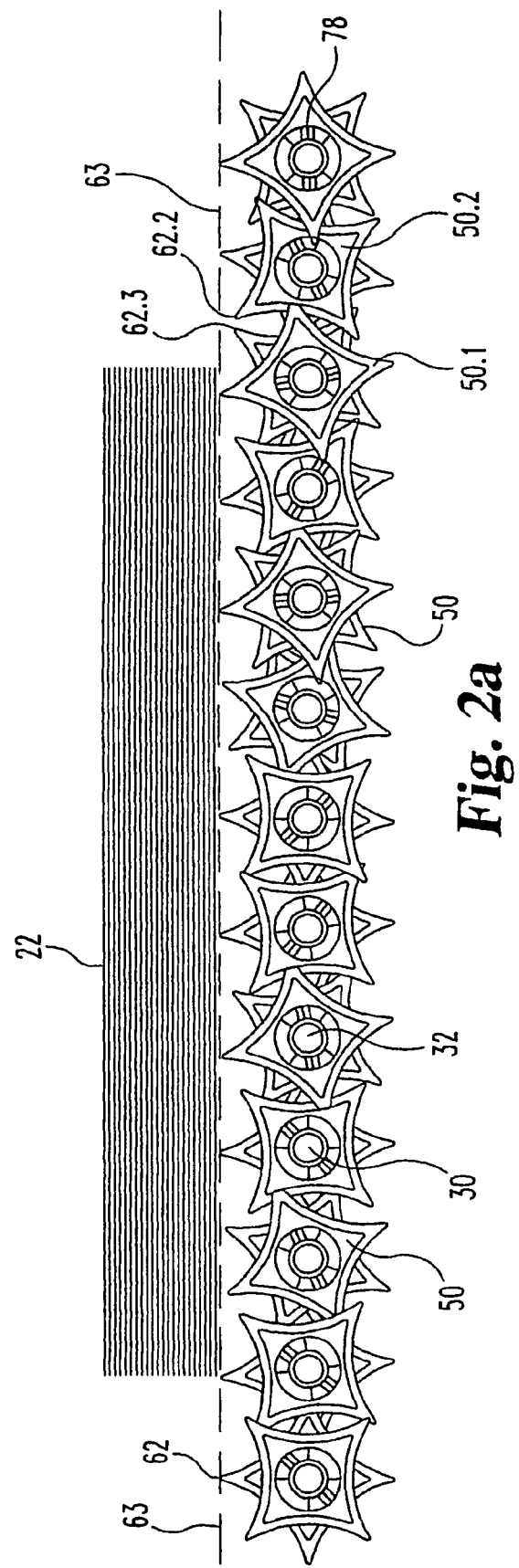

COMPRESSION PASSING ROLLER

CROSS-REFERENCE TO RELATED APPLICATIONS

The present application is the national stage of International Patent Application PCT/US03/41519 filed Dec. 30, 2003 (which was published in English), which claims the benefit of U.S. Provisional Application No. 60/437,526 filed Dec. 31, 2002, all of which are hereby incorporated by reference.

FIELD OF TIE INVENTION

The present invention relates to improvement in material conveying methods and apparatus, and in particular those conveying methods and apparatus used for conveying stacks of paper.

BACKGROUND OF THE INVENTION

When manufacturing companies use conveyors to tie their in-process machinery together, they often not only want the conveyors to move their product between machines but to also accumulate the product between machines. Accumulation on a conveyor happens when product is stopped from moving forward off the end of the conveyor and subsequent products, still moving, come to a rest when they bump into the first one stopped. A second, third, and forth, etc., product then lines up behind the first one stopped—all while the conveyor is running. Equally important then is when the stop is removed, the stopped products need to resume their forward travel. The accumulation ability of conveyors allows the manufacturer to run an asynchronous operation. If no accumulation of product were possible, due to conveyor limitations, all the machines required for the product manufacturing process would have to run at the same rate and would be locked in step, that is, synchronized. With non-accumulating conveyors, if one of the synchronized machines needed to be stopped momentarily to clear the jam, all the upstream machines would also have to be stopped. Then all those machines would have to be restarted simultaneously. Many companies avoid this situation by using accumulating conveyors to connect their machinery. This way, when any one machine goes down, the upstream machines can keep producing with their output just accumulating on the conveyor.

Accumulating conveyors came in many types. Some products require a certain type of conveyor to be used during their manufacture; some products can work with any type of accumulating conveyor. The basic goals for an accumulating conveyor include the ability to transport and accumulate the product without damaging the product.

When moving a stack of loose unbound sheets of paper some conveyor types do not accumulate without damaging the bottom layers. Others do not transport without damaging the bottom layers. When a stack of loose paper or other horizontally stacked product is conveyed on some roller conveyors, the trailing edge of the bottom layers can be displaced out the backside of the stack. This creep or shingling of the bottom-most layers will potentially cause subsequent machinery to damage the bottom displaced sheets. Some roller conveyors can accumulate stacks of paper as long as the rollers can be stopped from rotating while products are in accumulation.

When paper stacks are conveyed on a roller conveyor, the weight of the stack is concentrated on the lines of contact tangential with each roller. This produces compression zones in the lower layers of paper in the area just above each roller.

The amount of compression depends upon the type of paper and the height of the stack. The paper in the area between the rollers then forms what looks like a sag, but is really an area that is not as compressed as the zones directly over the roller. When the rollers rotate to convey the paper stack forward, the compression zones and sags do not move relative to the conveyor; rather it is the paper that moves through them. Each new roller encountered by the paper stack creates its own compression zone and resulting sag. When the trailing edge of the moving stack comes off a roller, the compression zone disappears and the extra material in the sag is seen as displaced paper. Each roller creates a sag and all the sags, worked back and off the trailing edge, contribute to the total displacement of the lowest layers. The longer the distance the stack travels on a roller conveyor, the more displacement is created. Also, the taller the stack the greater is the displacement. If this creeping or shingling is allowed to grow, it is possible that the entire stack of products can fall over.

What is needed is an apparatus and method which minimizes or eliminates shingling or creeping of products in a stack. The present invention does this in a novel and unobvious way.

SUMMARY OF THE INVENTION

One embodiment of the present invention includes a method for conveying a product, comprising providing a conveyor having at least one roller shaft, the roller shaft having a plurality of rotating rollers. The method also includes lifting the product by rotating the rollers. In yet other embodiments, the method also includes conveying the product during said lifting by rotating the rollers.

A further embodiment of the present invention includes a method for conveying a product comprising providing a conveyor having a plurality of translatable roller shafts, each roller shaft supporting a plurality of rotatable rollers, the rollers being slippable on the corresponding shaft. The method also includes supporting the product by the rollers, and conveying the product by translating the roller shafts which support the rollers. The method includes translating the roller shafts under the product. The method also includes rotating the rollers under the product, and lifting and lowering a portion of the product by the rollers.

Another embodiment of the present invention includes a roller for a conveyor, comprising a body having an outer diameter adapted and configured for conveying a product. The outer diameter includes at least two lobes and less than nine lobes. In some embodiments, the body includes a side having an interlocking member for coupling to an adjacent component.

Yet another embodiment of the present invention includes an apparatus for conveying a product, comprising a roller shaft having an outer diameter. The apparatus also includes a plurality of rollers rotatably supported by the roller shaft, each roller having an outer surface and a plurality of lobes placed circumferentially around the outer surface. Each roller has an inner diameter adapted and configured for being driven by the shaft. In some embodiments, the roller is a slippable roller.

Another embodiment of the present invention includes an apparatus for conveying a product, comprising a roller shaft. The apparatus also includes a plurality of rollers supported by the roller shaft, each roller having a plurality of lobes. Adjacent rollers are in fixed relationship to each other such that there is a predetermined angular offset from a lobe of one roller to a lobe of the next roller. In some embodiments, the angular offset is more than about 14 degrees and less than about 56 degrees.

Another embodiment of the present invention includes an apparatus for conveying a product, comprising a plurality of roller shafts. The apparatus also includes a plurality of driven rollers supported by each roller shaft. Each roller has a plurality of outwardly extending lobes. In some embodiments the apparatus also includes a static member having a top surface and a length and extending longitudinally across at least two shafts. The lobes support the product at a first vertical height, and the top surface of the static member is adapted and configured to support a portion of the product between a pair of said rollers at a second vertical height. In some embodiments the second vertical height is less than the first vertical height, whereas in other embodiments the second vertical height is about equal to the first vertical height. In yet other embodiments the second vertical height is greater than the first vertical height.

Yet other aspects of the present invention are disclosed in the detailed description, drawings, and claims to follow.

DESCRIPTION OF THE DRAWINGS

FIG. 2a is a side elevational view of a portion of one of the conveyors of FIG. 1 with portions of the structure removed to simplify the view.

FIG. 14, as well as other figures, includes various dimensions in millimeters or degrees, representative of a specific embodiment of the present invention. These dimensions are not to be considered restrictive in interpreting any of the inventions herein, and are for illustrative purposes only.

DESCRIPTION OF THE PREFERRED EMBODIMENT

Figure 1:
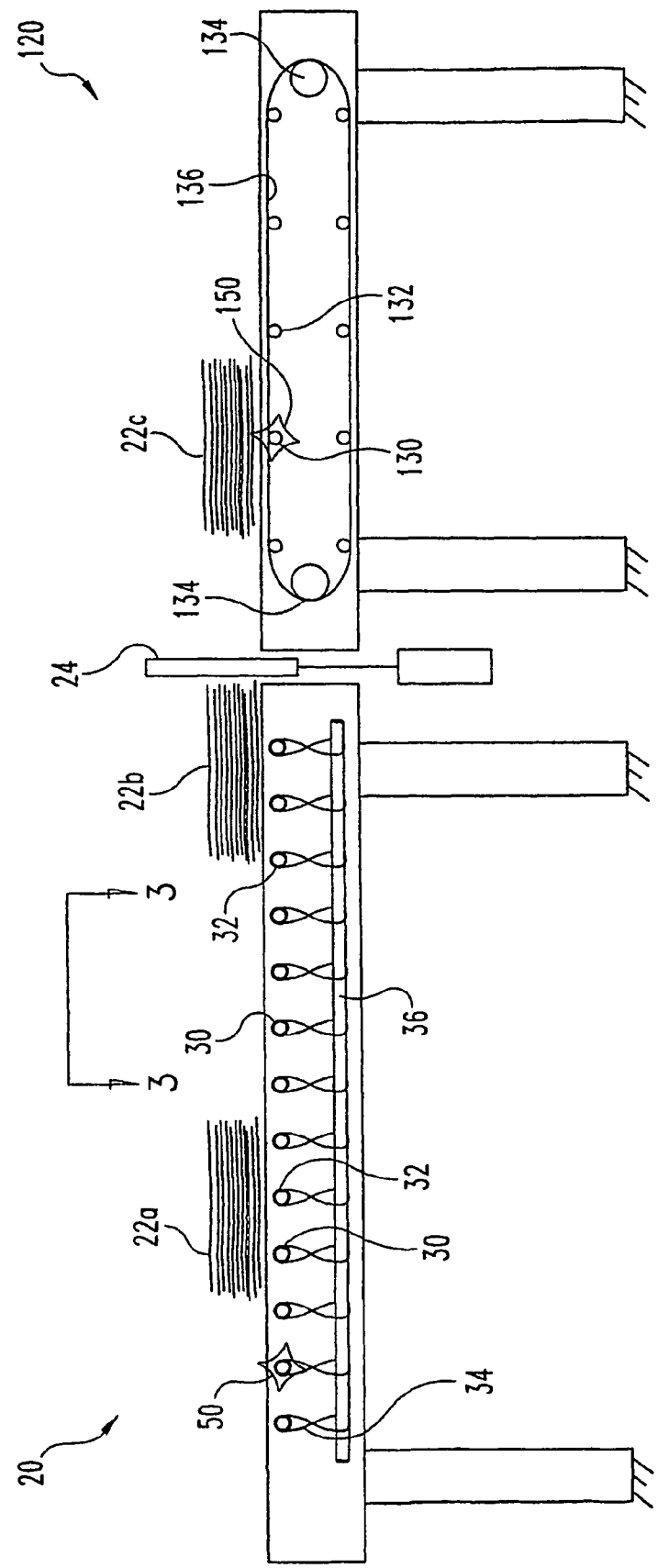
FIG. 1 is a side elevational view of a schematic of two conveyor assemblies according to various embodiments of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

This application incorporates by reference U.S. Pat. No. 6,193,047, issued Feb. 27, 2001. Further incorporated by reference is PCT Application Serial No. US99/17184, filed Jul. 29, 1999 and U.S. patent application Ser. No. 09/743,172, filed Jan. 5, 2001.

The present invention relates to method and apparatus for conveying a product, especially a product being conveyed in a vertical stack. The various inventions contemplated herein either reduce or eliminate shingling of a conveyed, vertically-stacked product, especially in comparison to some proposed designs which appear to be intended to reduce shingling after it has already happened.

In some embodiments, the present invention is adapted and configured for conveying a product such as a stack of loose, unbound paper. Yet other embodiments are adapted and configured for conveying a stack of cardboard sheets. In some embodiments, the stacked product is lifted in one or more localized areas by a plurality of rotating rollers and simultaneously conveyed along a path by the rotating rollers as the lifting force is applied. When the product is stopped such as for accumulation, the rollers maintain steady contact with the bottom side of the stack, and slip relative to their corresponding roller shaft. In yet other embodiments, the stack of products is conveyed by a plurality of translating roller shafts. When the product is stopped, such as for accumulation, the roller shafts continue to move underneath the product, but the rollers on the shaft and in contact with the bottom of the product move along the underside of the product while slipping on the shaft.

In one preferred embodiment of the present invention, the rollers have a non-circular outer surface with a plurality of lobes in contact with the product. For those embodiments where the rollers rotate relative to the product, the lobes locally lift up one portion of the product to a greater extent than other portions of the product adjacent to the lobe. Thus, although the lifting action of the lobe is applied to the entire stack of products, if the stack of products is flexible (such as a stack of paper) the portion of the product in contact with the lobe will be more compressed than the product portions adjacent to the lobe. These adjacent portions therefore appear to be sagging on areas away from the lobe contact area. Some embodiments of the present invention include a stabilizer strip, or static member, which is placed on the conveyor to provide vertical support in these areas of relative sagging.

In yet other embodiments of the present invention a conveyor includes at least one roller shaft which rotatably supports a plurality of lobed rollers. Preferably, adjacent lobed rollers are adapted and configured such that the lobes of one roller are angularly shifted relative to the lobes of the adjacent roller. This angular offset or phase-shifting of lobes can be accomplished by interlocking adjacent rollers together so that there is a fixed relationship between the lobes of one roller with the lobes of the adjacent roller. In some embodiments, the rollers of a particular shaft are interlocked in pairs, and in other embodiments, the rollers are interlocked in triplets. The present invention also contemplates those embodiments in which more than three rollers, including all the rollers, of a shaft are interlocked one to the other.

The present invention contemplates lobed rollers which are shippable relative to the roller shafts and also rollers which are fixed on their respective shafts. In addition, the present invention contemplates roller shafts that extend completely across the conveying surface of the conveyor. However, the present invention also contemplates those embodiments in which the roller shafts are stub-shafts which extend from opposing sides of the conveyor in a cantilevered manner.

It is understood that any specific dimensions or quantities described or shown in this application are by way of example only. These dimensions and quantities describe or depict only certain specific embodiments of the invention and are not to be considered to be limiting.

FIG. 1 is a side elevational view of a pair of conveyor assemblies 20 and 120 according to various embodiments of the present invention. Conveyor 20 includes a plurality of first and second roller shafts 30 and 32 arranged in an alternating pattern along the length of conveyor 20. Each roller shaft 30 and 32 is preferably driven by a belt 34 which is wound around a drive shaft 36 which is powered by a motor 40 (not shown). Each roller shaft 30 and 32 are bearingly received within a frame of conveyor 20. Roller shafts 30 and 32 are rotatable, but rotate at a particular position established by the frame of conveyor 20.

Two stacks of horizontally stacked products 22 such as newspapers are shown supported by conveyor 20. A first stack 22a is being conveyed along the plane of a conveying surface 63 defined by the rollers. A second stack of products 22b is shown at one end of conveyor 20, having been accumulated at that end of roller 20 by an actuatable product stop 24. The lowering of product stop 24 permits a quantity of product to move from the accumulating station on conveyor 20 onto the conveying plane defined by the rollers of conveyor 120. It is understood that the present invention is not restricted to sequential placement of multiple conveyors, as shown in FIG. 1. The present invention contemplates any arrangement of conveyors, including stand-alone conveyors 20 and their equivalents, stand-alone conveyors 120 and their equivalents, combinations of conveyor 20 and 120, and combinations of conveyor 20 and/or conveyor 120 with conveyors, workstations, wrapping equipment, and other components related to the product being conveyed. Further, the use of an actuatable product stop is not required.

Adjacent and downstream to conveyor 20 is a second conveyor 120. As used herein, a prefix N in front of an element number XX (such as NXX) refers to an element NXX that is the same as the element XX, except for those specific differences shown and/or discussed which pertain to the modified element NXX. A suffix "A" after an element number XX (such as XX.A) refers to an element XX.A that is a member of the family of element XX and is a specific example of an element XX, including certain specific information regarding, for instance, dimensions, materials, processing methods, location, direction, scaling, or spacing for the particular element XX.A.

Conveyor 120 includes a plurality of roller shafts 130 and 132 arranged in an alternating pattern and spaced along a continuous, non-ending chain 136. Roller shafts 130 and 132 are attached to chain 136 and move with chain 136. Chain 136, along with roller shafts 130 and 132, are driven in a continuous loop along the top and bottom surfaces of conveyor 120 by a pair of drive sprockets which are driven by a motor 140 (not shown). Conveyor 120 is shown with a quantity of product 22c, which had been previously stopped by product stop 24.

Figure 2B:
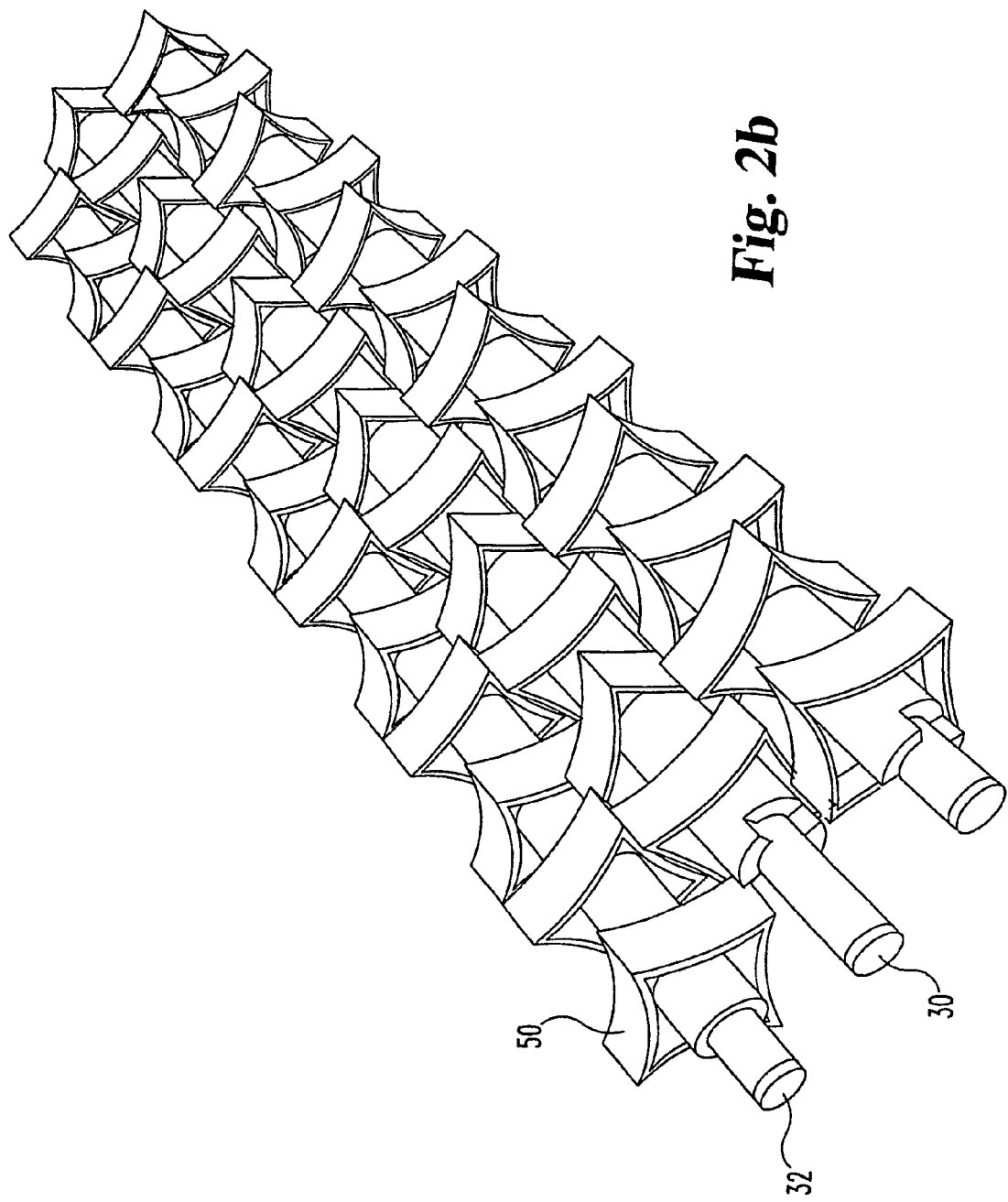
FIG. 2b is a top and side perspective view of a portion of the rollers and roller shafts of FIG. 2a with the product removed to simplify the view.
Figure 3:
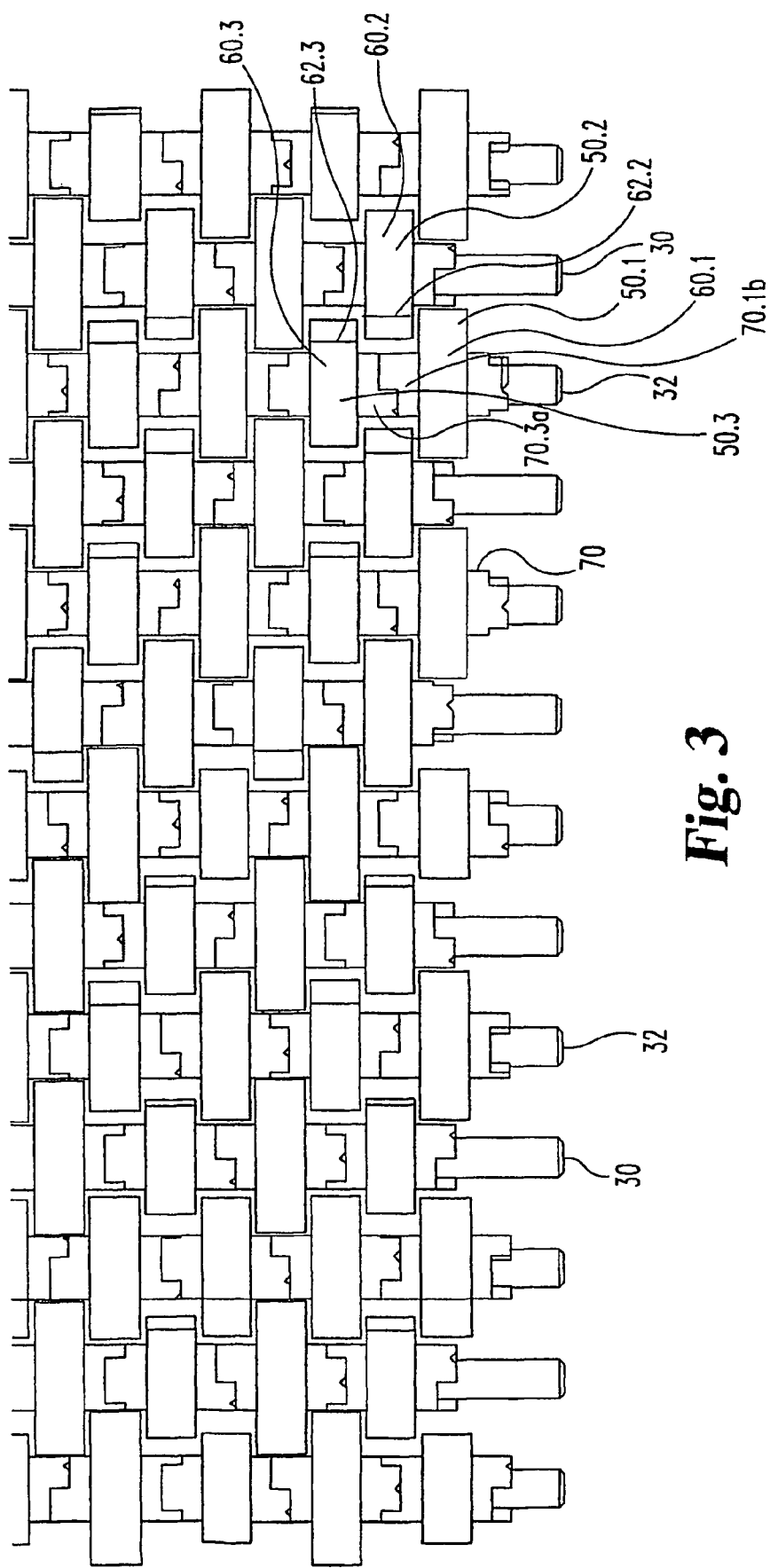
FIG. 3 is a top view of a portion of one of the conveyors of FIG. 1 as taken along line 3-3 of FIG. 1.

FIGS. 2a and 2b are simplified, close up views of a portion of conveyor 20. A stack of paper 22 is shown being transported along a conveying surface 63 defined by the cusps or points 62 of the lobed rollers 50 of conveyor 20. FIG. 3 is a top view of a portion of the rollers and roller shafts of FIG. 2a, with the stack of conveyed product 22 removed for clarity.

Figure 6:
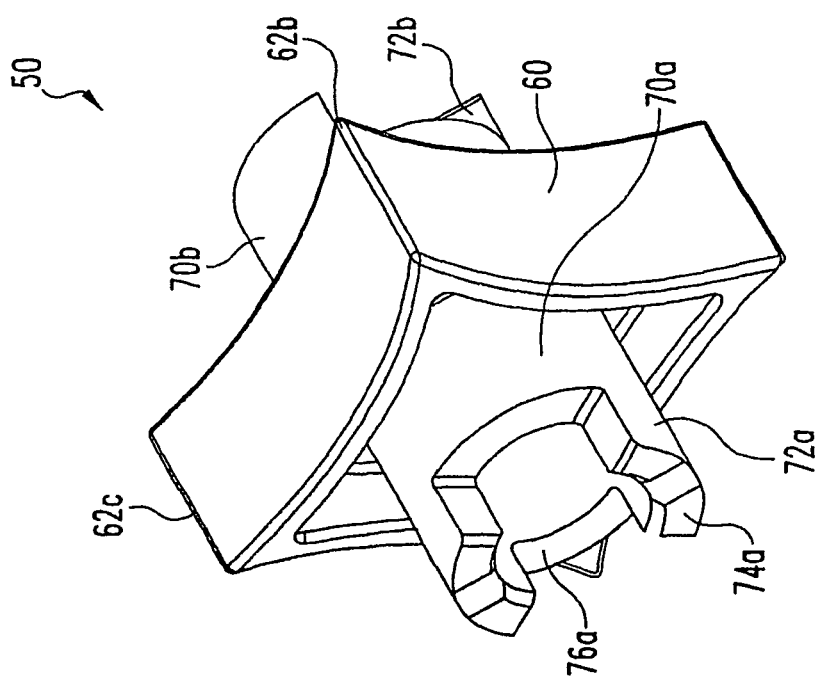
FIG. 6 is a top, side perspective view of a roller according to one embodiment of the present invention.
Figure 9:
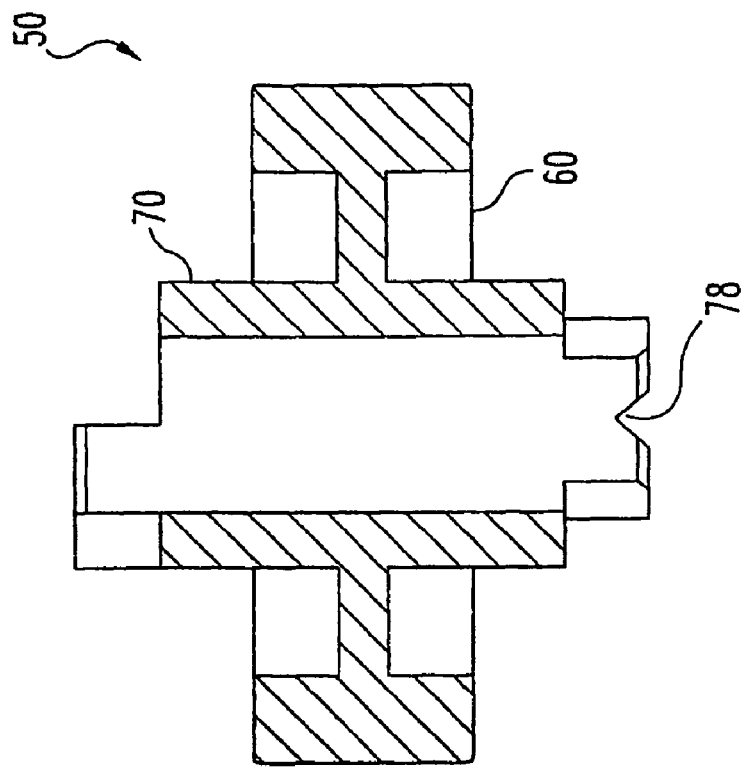
FIG. 9 is a cross sectional view of the roller of FIG. 7 as taken along line F-F of FIG. 7.
Figure 8:
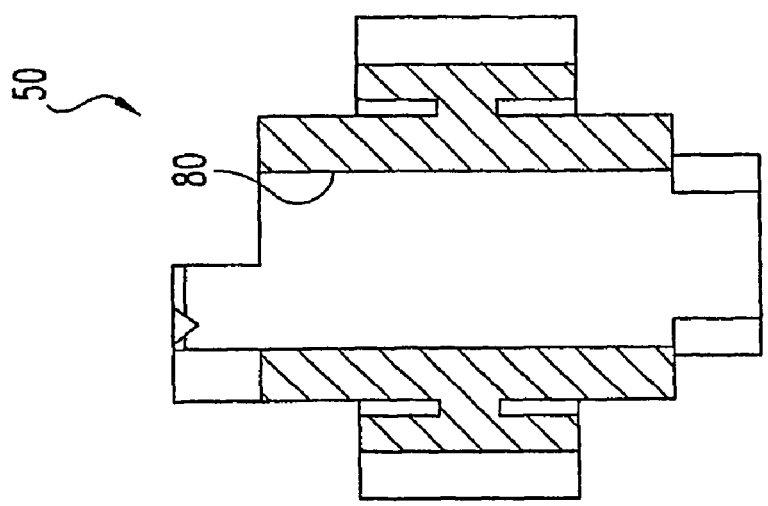
FIG. 8 is a sectional view of the roller of FIG. 7 as taken along line C-C.
Figure 12:
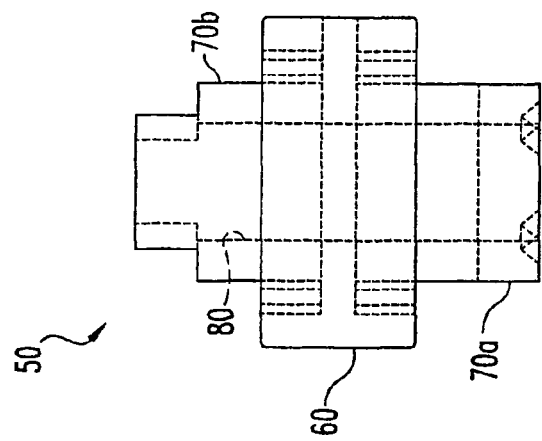
FIG. 12 is a top view of the roller of FIG. 10.
Figure 11:
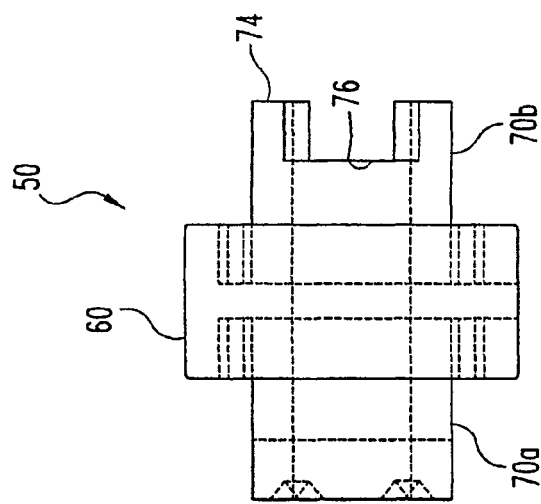
FIG. 11 is a front view of the roller of FIG. 10.
Figure 10:
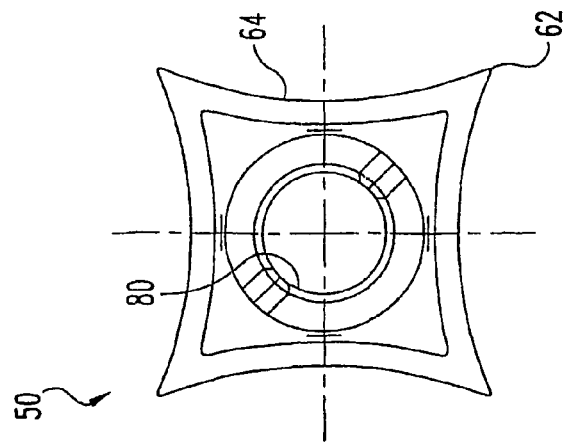
FIG. 10 is a side elevational view of a roller according to one embodiment of the present invention.

In one embodiment of the present invention, conveyor 20 includes a plurality of roller shafts 30 and 32 arranged in an alternating pattern along the length of conveyor 20. Each roller shaft 30 and 32 preferably includes a plurality of lobed rollers 50, as best seen in FIG. 6. Preferably, a roller 50 includes a lobed conveying portion 60, which comes into contact with and conveys product 22, and a hub portion 70 for rotatable support of the roller on the roller shaft and interconnection of adjacent rollers on a roller shaft.

Referring again to FIGS. 2 and 3, the rollers 50 on a particular shaft are arranged such that the conveying portion of a roller on a first shaft is located axially on that shaft in a location which corresponds to an axial location on a second, adjacent shaft which is between the conveying portions of two adjacent rollers on that second shaft.

Referring to FIG. 3, a roller 50.2 is located coaxially on a roller shaft 30 and closest to an end of shaft 30. On the adjacent shaft 32, a roller 50.1 is located coaxially on shaft 32 closest to an end of shaft 32. A second roller 50.3 is coaxially located on the same shaft 32, but axially spaced apart from roller 50.1. Roller 50.2 is placed at a location on shaft 30 such that conveying portion 60.2 is located between conveying portion 60.1 of roller 50.1 and conveying portion 60.3 of roller 50.3.

In one embodiment of the present invention, roller shafts 32 and 30 are spaced apart along the length of the frame of conveyor 20 such that conveying portions of rollers on the two adjacent shafts overlap. As best seen in FIG. 3, a portion of the conveying portion 60.2 is closer to the centerline of shaft 32 than some portions of the conveying portions 60.3 and 60.1 of rollers 50.3 and 50.1, respectively.

The present invention also contemplates those embodiments in which adjacent shafts 30 and 32 are more widely spaced apart, such that there is not "overlap" of the conveying portion of a roller on one shaft with the conveying portion of a roller on an adjacent shaft. Further, although what has been shown and described are adjacent roller shafts in which a roller on a first shaft is spaced axially along that shaft so that the conveying portion is located between conveying portions of two adjacent rollers on the adjacent shaft, the invention is not so limited, and also includes those embodiments in which a roller on a first shaft is axially located along that shaft such that the conveying portion of that roller is axially aligned with the entirety of the conveying portion of a roller on the second, adjacent shaft, or alternately lined up so that at least a portion of the conveying portion of the roller on the first shaft is lined up with a portion of the conveying portion of the roller on the second, adjacent shaft.

Figure 4:
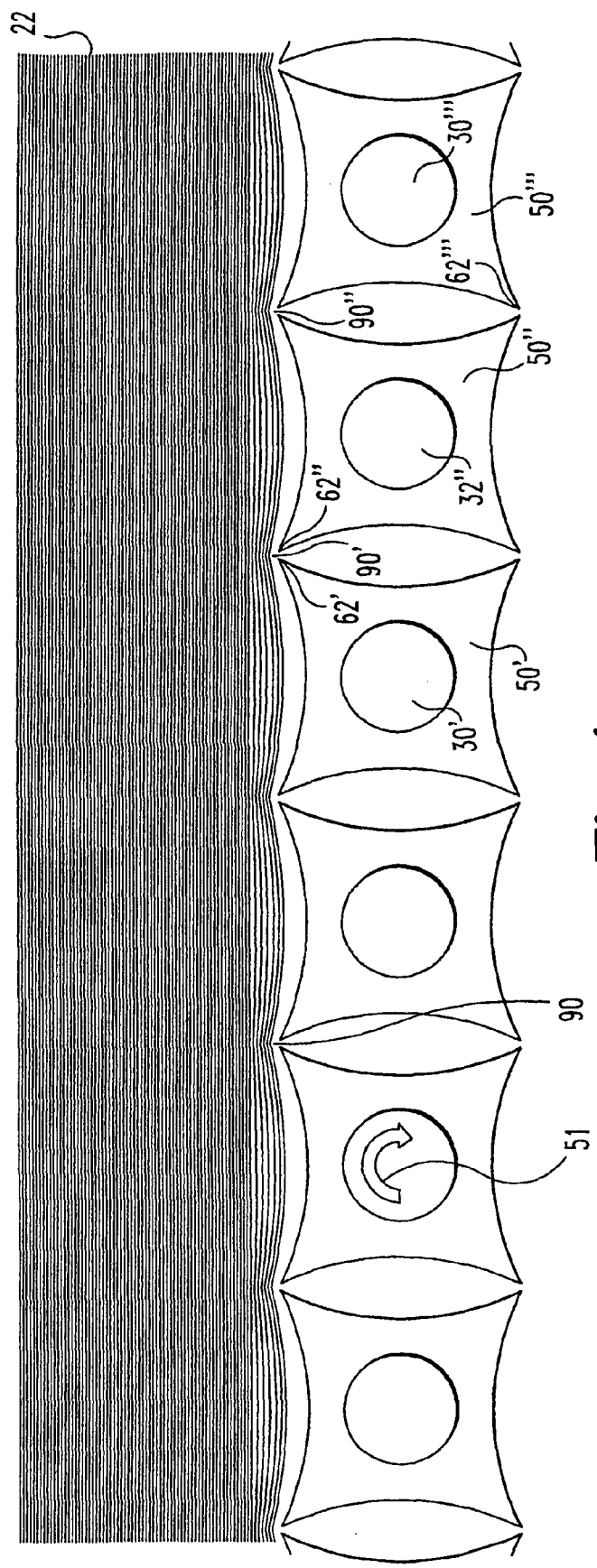
FIG. 4 is a side elevational schematic representation of an apparatus according to one embodiment of the present invention.
Figure 5:
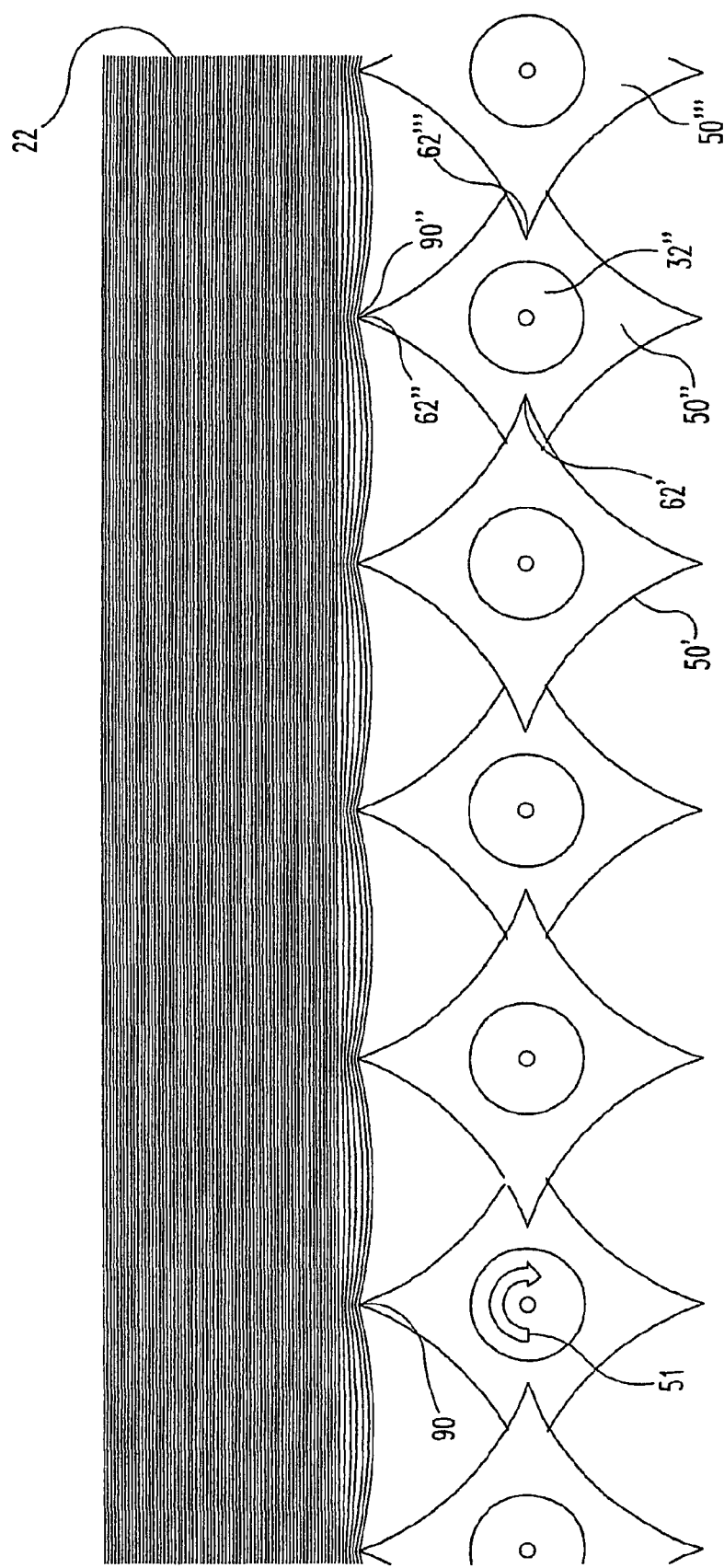
FIG. 5 is a side elevational schematic view of the invention of FIG. 4 with the rollers displaced by 90 degrees.
Figure 7:
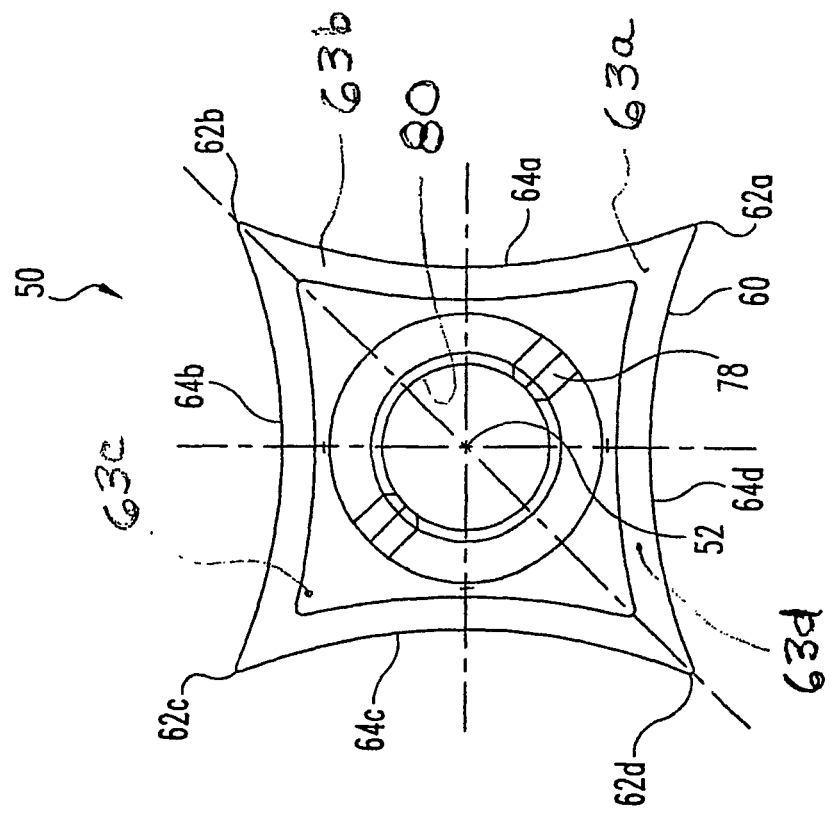
FIG. 7 is a side elevational view of the roller of FIG. 6.

FIGS. 4 and 5 depict schematically how rollers according to one embodiment of the present invention pass the compressed portion of the product 22 from the rollers of one roller shaft to the rollers of the adjacent roller shaft. Referring first to FIG. 4, a horizontally stacked product 22, such as a grouping of newspapers or other materials is shown supported by a plurality of rollers 50. Each roller preferably includes a plurality of lobes located around the outer surface of the body of the roller, each lobe having a corresponding point or cusp 62, which are the portions of that particular roller located the greatest distance from the centerline of that roller. In one embodiment, roller 50 is star-shaped.

Product 22 is supported along the underside of its length at a plurality of compressed areas 90. In some embodiments of the present invention, the product being conveyed has insufficient in plane rigidity, in consideration of the weight of the product being conveyed, to prevent limited deformation when contacted and supported by a cusp 62. This limited deformation results in upward compression of the product 22 at a plurality of compressed areas 90, with some relative sagging of the product in between points 90.

As rollers 50 rotate in the direction of rotation 51, the conveyed product 22 is picked up by each ascending cusp 62 of a lobe, and locally lifted up by the cusp as shown in FIG. 5. As the rollers 50 continue to rotate, the material is conveyed in a direction (right to left, as viewed in FIG. 5) and passed to the adjacent roller.

As one example, in referring to FIGS. 4 and 5, a cusp 62' of a roller 50' is in contact with a compression zone 90' of product 22. A cusp 62" of roller 50" is in contact with a compression zone 90". As described previously for one embodiment of the present invention, roller 50' on shaft 30' is located at a first axially location along shaft 30', and roller 50" is located at a second axially location along shaft 32", such that the first axial location and the second axial location are different. Therefore, compression area 90' is located at a location on the underside of product 22 spaced apart from compression zone 90"

As rollers 50', 50", and 50'" rotate 90 degrees clockwise (as best seen in FIG. 5) cusp 62" maintains contact with compression zone 90" as roller 50" aids in lifting and transporting (from left to right) product 22. Cusp 62' rotates out of contact with compression zone 90'. As rollers 50 rotate another 90 degrees (not shown), cusp 62'" of roller 50'" will move into contact with the compressed portion 90' of product 22 previously in contact with cusp 62'.

As roller shafts 30 and 32 continue to rotate, product 22 is lifted and carried at compression points 90 which are generally located along a linear portion of the underside of product 22, but which are also spaced apart from one another.

FIGS. 6-12 depict various views of a roller 50 according to one embodiment of the present invention. FIGS. 6-12 are scaled drawings. Although certain specific dimensional relationships are shown, the present invention is not so limited and rollers and conveyors can be fabricated in a variety of sizes and shapes in other embodiments of the present invention.

FIG. 6 shows a roller 50 having a central conveying portion 60 with hub portions 70a and 70b located on each side of the body or conveying portion 60. As noted previously, conveying portion 60, in one embodiment of the present invention, includes a plurality of cusps 62a, 62b, 62c and 62d, each cusp being the portion of a corresponding lobe 63a, 63b, 63c, and 63d, respectively of roller 50. Each cusp includes the locus of local points furthest away from the centerline of roller 50. Interconnecting adjacent cusps 62 are concave surfaces 64a, 64b, 64c, and 64d. Points along the span of each concave surface 64 are located at a radial distance from the centerline of roller 50 that is less than the radial distance of the corresponding cusp 62 for that interconnecting surface. By way of example, rotation of roller 50 in FIG. 7 would result in each cusp 62a, 62b, 62c, and 62d scribing a circular arc about roller 50 centerline 52. Preferably, all portions of concave surfaces 64a, 64b, 64c, and 64d lie within the scribed circle.

Although what has been shown and described are cusp points 62 that are generally equidistant from centerline 62, the present invention is not so limited, and includes those rollers in which some cusp point of a roller are closer to the centerline of the roller than other cusp points. Further, although a roller 50 including four cusp points 62 has been shown and described, the present invention also contemplates rollers having as few as a single cusp point, and also having more than four cusp points. In addition, although the interconnecting lobed surfaces between adjacent cusp points have been described as having a concave shape, the present invention is not so limited and further includes a variety of interconnecting shapes between cusp points, including linear shapes and multiply curved shapes. Preferably, the interconnection portion or lobed portions between cusp points occurs at radial locations that are a lesser radial distance compared to the radial distance from the roller centerline 52 of the adjacent cusps.

Further, as best seen in FIG. 6, each cusp 62 is preferably a linear region of conveying portion 60 that is generally parallel to the centerline 52 of roller 50. However, the invention is not limited to this geometry, and includes linear cusp portions that are not parallel to the roller centerline, and further includes cusp portions that are not linear but also curved (for example, helical shapes).

Referring again to FIGS. 6-12, each roller 50 includes a hub portion 70, which is adapted and designed for interfacing with a roller shaft. In one embodiment of the present invention, hub 70 includes an inner diameter 80, which is adapted and configured to make roller 50 slippable on a roller shaft 30 or 32. In one embodiment, roller 50 is fabricated from a material such as acetal or other materials commonly used for conveyor rollers.

In one embodiment, the hub portions 70a and 70b of roller 50 extend from either side of conveying portion 60. Each hub portion 70a and 70b preferably includes interlockable keyways 72a and 72b, respectively. Keyway 72a is located on a first side of roller and keyway 72b is located on the opposite side of roller 50. Keyways 72a and 72b are adapted and configured to interlock with the keyway of an adjacent roller 50 when assembled on a roller shaft. For example, a keyway 72b of a first roller 50 would interlock with a keyway 72a of an adjacent roller 50. Torque from a first roller can be passed to a second roller through the interlocking keyways. Although what has been shown and described are hub portions 70a and 70b that extend from either side of conveying portion 60 the present invention also contemplates those embodiments in which the hub extends asymmetrically from the conveying portion, such as a roller in which hub portion 70a' extends a first distance from the conveying portion, and hub portion 70b' extends a second, lesser distance from the conveying portion. The present invention also contemplates the use of separate spacing members assembled onto a roller shaft in-between adjacent rollers in place of integral hub portions.

In one embodiment, keyway 72b has a first angular orientation with respect to the cusps of the roller, and keyway 72a has a second different angular orientation with respect to the cusps of the same roller. Because of this difference in angular orientations, interlocking a keyway of a 72b of a first roller to a keyway 72a of a second adjacent roller results in a difference in angular orientations between the cusps of the first roller and the cusps of the second roller of a pair of adjacent rollers. However, the present invention also contemplates those embodiments in which keyways 72a and 72b have the same angular orientation with respect to the cusps of the roller, such that interlocking of adjacent rollers results in alignment of corresponding cusps. Further, the present invention contemplates those embodiments in which a first roller have a first number of cusps is interlocked with a second adjacent roller that has a second, different number of cusps. In this embodiment, the difference in number of cusps between adjacent rollers results in angular spacing apart of cusps. For example, a first roller having four equally spaced cusps could be aligned with a second roller having three equally spaced cusps. Further, the present invention contemplates those embodiments in which the lobes and cusps of a roller are not equally spaced about the centerline of the roller.

Again referring to FIG. 6, interlockable keyways 72a comprises a pair of male protrusions separated by complementary shaped female portions. In one embodiment of the present invention, keyway 72b includes similarly shaped male protrusions 74b separated by complementary shaped female portions 76b. It is appreciated that the present invention is not limited to interlocking by way of male and female complementary shaped interlocking features. Interlocking of one roller with a second adjacent roller can be accomplished with a variety of hub shapes, including for example hubs with a plurality of small equally spaced castellations, and triangular-shaped, saw-tooth projections. Further, coupling or interlocking can be accomplished by use of a fastener, such as spring clip, lock ring, or deformable pin, between adjacent rollers that have overlapping hub portions. In some embodiments, an angular displacement between cusps of adjacent rollers can be accomplished manually during assembly of rollers on a roller shaft. In a preferred embodiment of the present invention, the face of each male protrusion 74a includes a notch 78. Means for coupling adjacent rollers includes features on the sides of the rollers that cause adjacent rollers to rotate together, and include the aforementioned interlocking features, as well as features such as friction fits (especially but not necessarily including roller compressing springs) and other features that do not result in a predetermined angular relationship between adjacent lobes, such as threaded coupling of one roller to another. The present invention also contemplates means for interlocking adjacent rollers, such interlocking means not only coupling adjacent rollers to rotate in unison but also establishing a predetermined angular relationship, or phase angle, between the lobes of adjacent rollers.

In yet another embodiment of the present invention, there is a roller conveyor 120 as shown in FIG. 1. Roller shafts 130 and 132 of conveyor 120 are interconnected along a chain 136 which loops about the frame of conveyor 120, driven by a pair of drive sprockets 134. During transport of product 22 along conveyor 120, roller shafts 130 and 132 and rollers 150 located thereon are not rotating to convey the product, as is the case with conveyor 20. Instead, roller shafts 130 and 132 move linearly with product 22 down the length of the conveyor following the path of the chain. When product 22 is stopped, roller shafts 130 and 132 continue to move under the influence of the chain drive. Rollers 150 rotate backwards under the product 22 as the chain 136 continues to drive the rollers forward under the stopped product 22.

In yet another embodiment of the present invention, a roller 250 is coupled to the supporting shaft 230 or 232 by means of a spring loaded clamp 248 that couples one or more of the rollers 250 to the corresponding shaft.

FIGS. 13-21 depict various alternate embodiments according to the present invention. Referring to FIGS. 13-18, a roller 350 is depicted according to one embodiment of the present invention. Roller 350 includes a central conveying portion 360 with hub portions 370a and 370b located on sides 379a and 379b, respectively, of the body or conveying portion 360. Preferably, body 360 includes a plurality of cusps 362a, 362b, 362c, 362d, and 362e, each extending from a lobe 363a, 363b, 363c, 363d, and 363e, respectively. Each cusp includes a portion of body 360 that is locally the furthest portion away from centerline 352. The portion of lobes 363 that interconnect adjacent cusps 362 include concave surfaces 364a, 364b, 364c, 364d, and 364e, respectively (concave as viewed from the perspective of the product).

Preferably, each lobe 363 is adapted and configured to locally contact a supported product by the cusp portion of the roller. Therefore, as the roller rotates relative to the product, the portion of the lobes inbetween adjacent cusps does not support the product. Preferably, lobes 363 and the corresponding cusps 362 are equally spaced about the outer surface of body 360. Further, it is preferably that each lobe is symmetric about a line interconnecting the cusp and roller centerline, although such symmetry is not required. Further, the present invention contemplates those embodiments in which the cusps and/or the lobes are not equally spaced about the outer surface of the roller body.

Each roller 350 includes a hub portion 370 which is adapted and configured for interfacing with a roller shaft. In one embodiment of the present invention, hub 370 includes an inner diameter 380 which is adapted and configured to make roller 350 slippable on a roller shaft.

Figure 13:
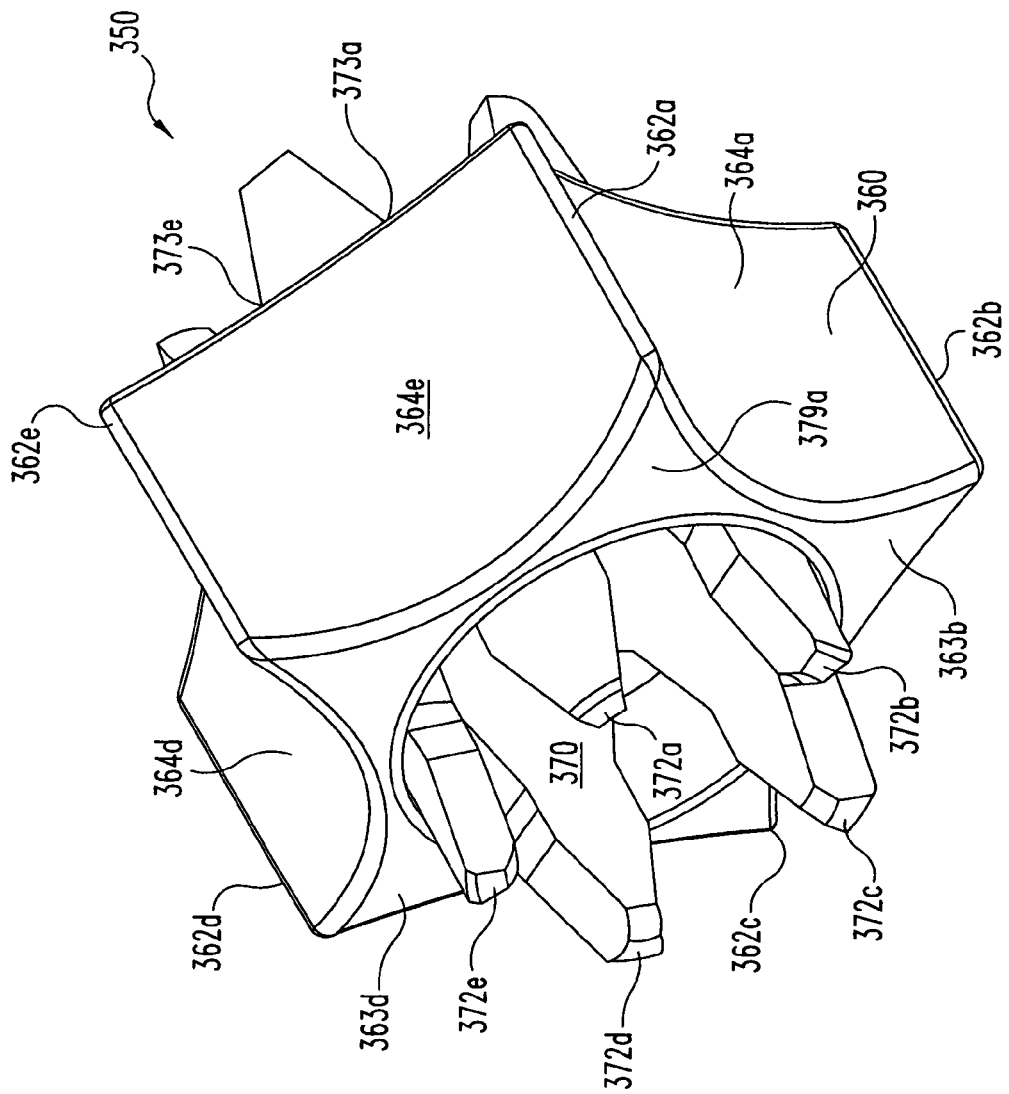
FIG. 13 is a top, side perspective view of a roller according to another embodiment of the present invention.
Figure 15:
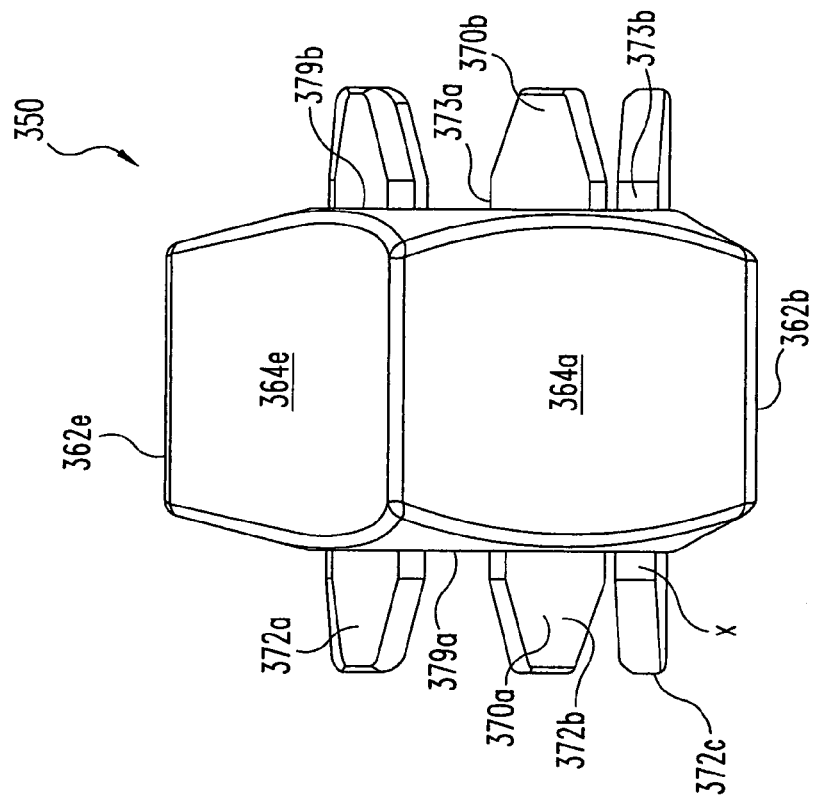
FIG. 15 is an orthogonal side view of the apparatus of FIG. 14.

Hub portions 370a and 370b of roller 350 extend from either side 379a or 379b of conveying portion 360. Preferably, each hub portion includes means for interlocking adjacent rollers. As best seen in FIGS. 13 and 15, a plurality of male interlocking features 372a, 372b, 372c, 372d, and 372e project laterally outwardly from side 379a in a direction substantially parallel to centerline 352. Side 379b of roller 350 includes a plurality of female interlocking features 373a, 373b, 373c, 373d, and 373e which are at least partly complementary in shape to male interlocking features 372, a male feature 372 of a first roller being receivable in the female feature 373 of a second, adjacent roller. By this interlocking of male and female features, the adjacent rollers rotate in unison.

Figure 16:
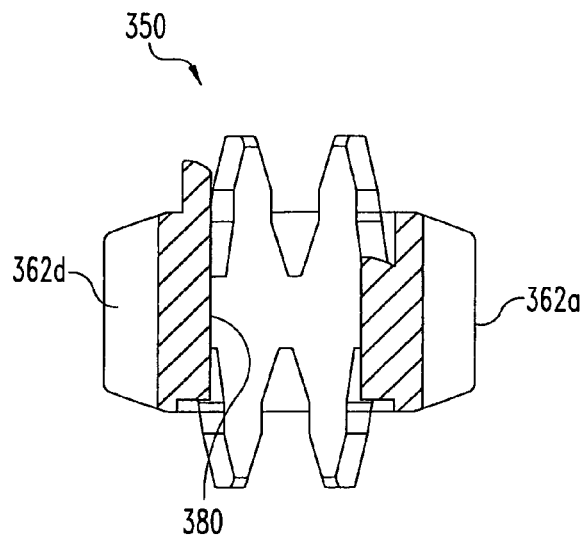
FIG. 16 is a cross-sectional view of the apparatus of FIG. 14 as taken along line A-A of FIG. 14.
Figure 17:
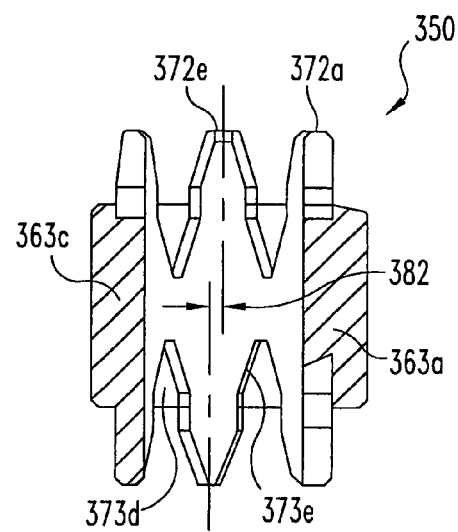
FIG. 17 is a cross-sectional view of the apparatus of FIG. 14 as taken along line B-B of FIG. 14.
Figure 18:
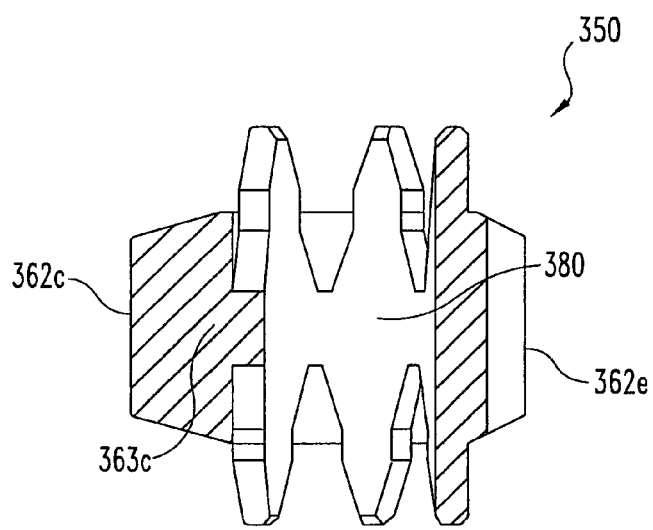
FIG. 18 is a cross-sectional view of the apparatus of FIG. 14 as taken along line C-C of FIG. 14.

As shown in FIGS. 13-18, and as best seen in FIGS. 16-18, roller 350 includes a plurality of male interlocking features extending from a first side of the roller, and a second set of male features extending from the other side of roller 350. Each side of roller 350 includes a plurality of female interlocking features interspersed between adjacent male interlocking features of that same side. Referring to FIG. 17, the male interlocking features of one side are angularly offset from the male interlocking of the other side by an angle 382 of from about 5 degrees to about 20 degrees. However, some embodiments of the present invention include sets of interlocking features extending from either side of the roller which are in phase (i.e., no angular offset). In one embodiments, angle 382 is about 14 degrees.

In a most preferred embodiment, each side of roller 350 includes equally-spaced male features separated by equally-spaced female features. Further, the male features of one side are preferably out of phase with the male features of the other side, and the female features of one side are preferably out of phase with the female features of the other side. However, the present invention also contemplates those embodiments in which male features extend only from one side of the roller, and female features are included in only the opposite side of that roller.

Figure 14:
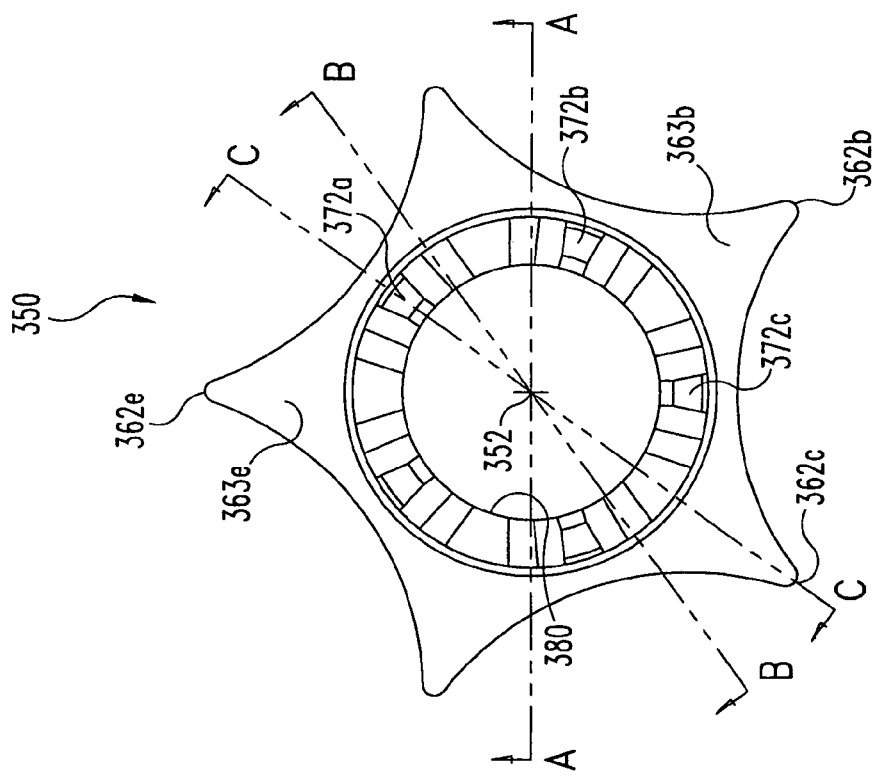
FIG. 14 is a side view of the roller of FIG. 13.

Further, a preferred embodiment of the present invention includes having a number of male features equal to the number of lobes projecting from body 360. Further, both the lobes and the interlocking features are equally spaced about the circumference of body 360. In a most preferred embodiment of the present invention, the equally-spaced male features of one side of roller 350 are offset relative to the lobes of that roller, such that when two rollers are interlocked there is a predetermined angular offset between the lobes of the adjacent rollers. Referring to FIGS. 14 and 15, an angular offset of 14 degrees is shown from cusp 362 to surface X of male feature 372c.

Figure 19:
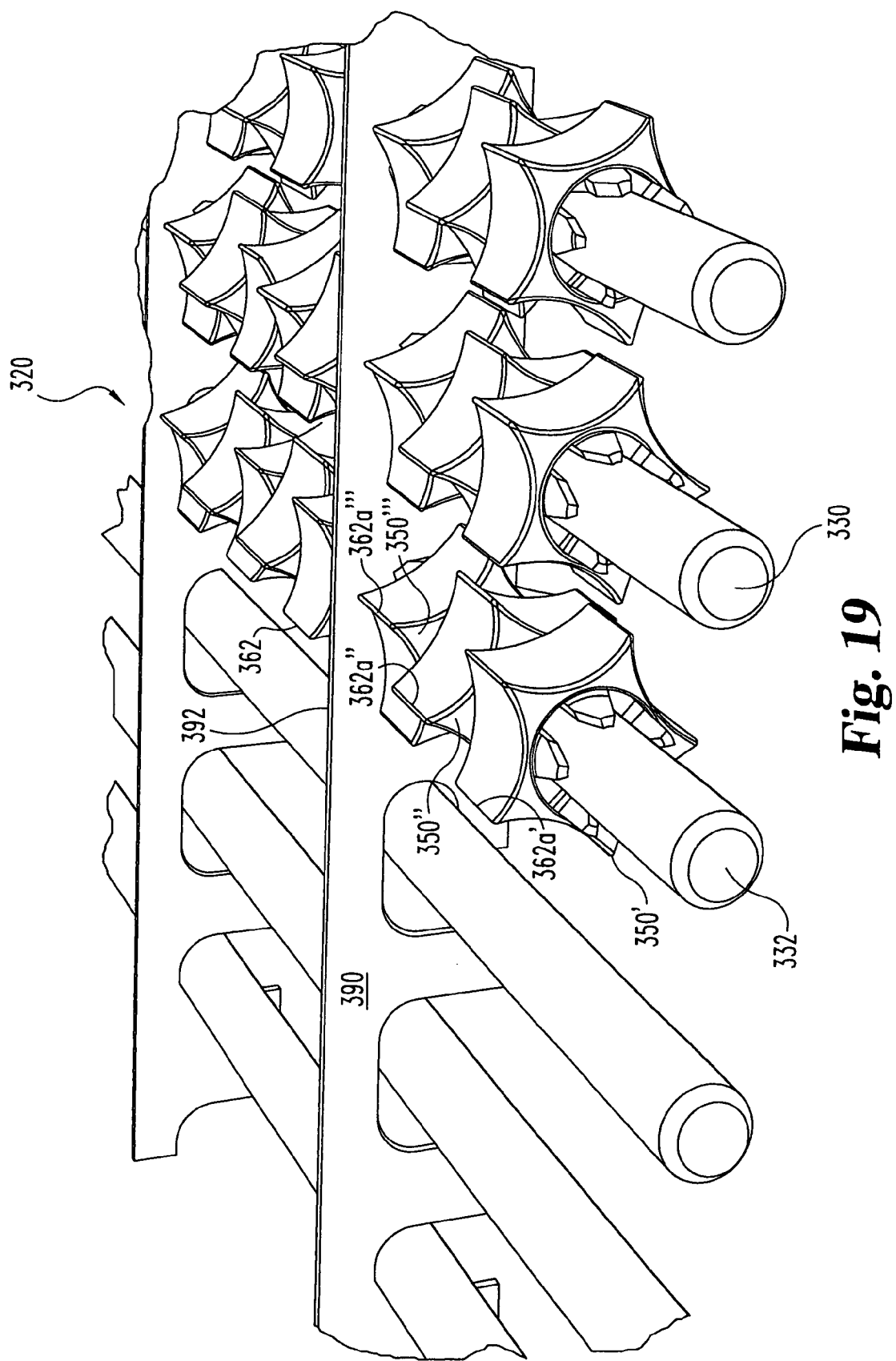
FIG. 19 is a top and side perspective view of a portion of the rollers, roller shafts and static members of a conveyor with some of the conveyor structure removed to simplify the view.

Referring to FIG. 19, a portion of a conveyor 320 is shown. Conveyor 320 includes a roller shaft 332 which rotatably supports a plurality of rollers 350. Rollers 350', 350" and 350''' are shown in an interlocked configuration, with the male interlocking features of one roller being received within the female interlocking features of the adjacent roller. Therefore, rollers 350', 350", and 350''' rotate in unison. Further, there is a predetermined angular offset among the lobes and cusps of these three rollers. There is a first angular offset from cusp 362a' to 362a". There is a second angular relationship between cusp 362a" and 362a'". In a most preferred embodiment, these two angular offsets are the same, although the present invention contemplates those embodiments in which there are different angular offsets between a middle roller and rollers interlocked on either side.

It has been determined experimentally that a slippable roller having 5 lobes and interlocking features that establish a 28 degree offset between adjacent lobes provides conveyance of a stack of paper products with little or no shingling and minimal vibration. However, the present invention contemplates angular offsets between adjacent lobes of more than about 14 degrees and less than about 56 degrees, although a more preferred range is more than about 21 degrees and less than about 37 degrees, and a most preferred range is more than about 24 degrees and less than about 32 degrees. Non-optimum angular offsets have been shown to introduce sideways shingling of a stock of paper products (i.e., shingling transverse to the direction of conveyance). It is believed that the acceptable angular offsets depend upon the nature of the conveyed product (especially the flexibility and weight of the product), as well as the number of lobes on the roller. With regards to the angular ranges described above, it is to be appreciated that the maximum angular offset also depends upon the number of lobes. For example, a roller with five, equally spaced lobes has an included angle of 72 degrees between lobes. Having an angular offset of more than half of this angle is ambiguous (i.e., an offset of 35 degrees is equivalent to an offset of 37 degrees).

Shown and described herein are 4-lobed and 5-lobed rollers. It has been determined that as the number of lobes is increased, there is also an increase in the tendency of the conveyed product to shingle. Rollers having twelve (12) lobes have been tested and some limited shingling occurred. Also, as the number of lobes in decreased, there is an increase in the tendency of the product to vibrate from the action of the lobed rollers. Even so, the present invention contemplates as few as two (2) lobes per roller or as many as twelve (12) lobes for certain types of products and certain roller angular offsets. It is believed that as the height of the product stack increases and/or as the thickness of the product decreases, there is a tendency acceptable results with fewer lobes. Preferably, the present invention contemplates rollers having 2 or more lobes and 9 or less lobes, although a more preferred range contemplates rollers having 3 or more lobes and 8 or less lobes, and a most preferred range contemplates rollers having 4 or more lobes and 6 or less lobes.

Some embodiments of the present invention also include a static member 390 which partly supports and is in contact with the product being conveyed by conveyor 320. Static member 390 assists in stabilizing the motion and shape of the stacked product as it is being conveyed. In one embodiments, the stabilizing static member 390 includes a plurality of slots such as slots 394', 394", and/or 394'''. These slots provide locations for vertical support of static member 390 by a plurality of roller shafts. Preferably, static member 390 has a length that extends across multiple roller shafts. In one embodiment, this stabilizing, static member is about one millimeter thick, and is fabricated from acetal or an ultra high molecular weight (UHMW) organic material.

Figure 21:
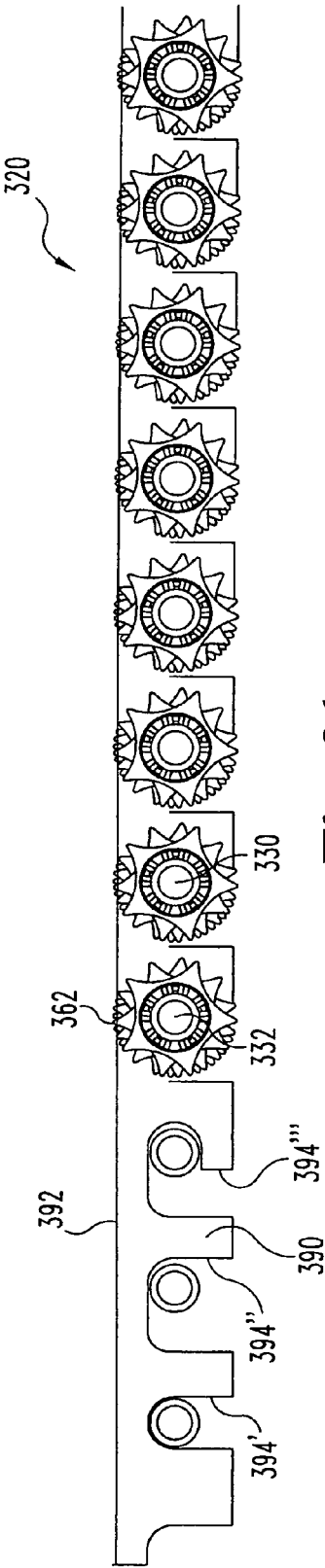
FIG. 21 is a side elevational view of the apparatus of FIG. 19.

In a preferred embodiment, the support slots 394 of static member 390 are adapted and configured such that the top, product-contacting surface 392 extends upward by a first vertical distance. As best seen in FIG. 21. The cusps 362 of the roller lobes project upward from the corresponding roller shaft by a second, maximum vertical distance. Preferably, the second vertical distance (or the upward most extent of the lobes) is greater than the first vertical distance, such that a product being conveyed by conveyor 320 is lifted the most by the cusps of the rollers, although the product is flexible enough to come into contact with upper surface 392. In one embodiment, upper surface 392 of static member 390 is about one millimeter lower than the upwardmost extent of the lobes of the adjacent rollers. However, the present invention contemplates vertical differences of more than about one half of a millimeter and less than about two millimeters, although a more preferred range is more than about one half of a millimeter and less than about one and one-half millimeters. However, the present invention also contemplates those embodiments in which the upper surface of the static member is equal to or slightly greater than the upwardmost extent of the adjacent lobes.

Figure 20:
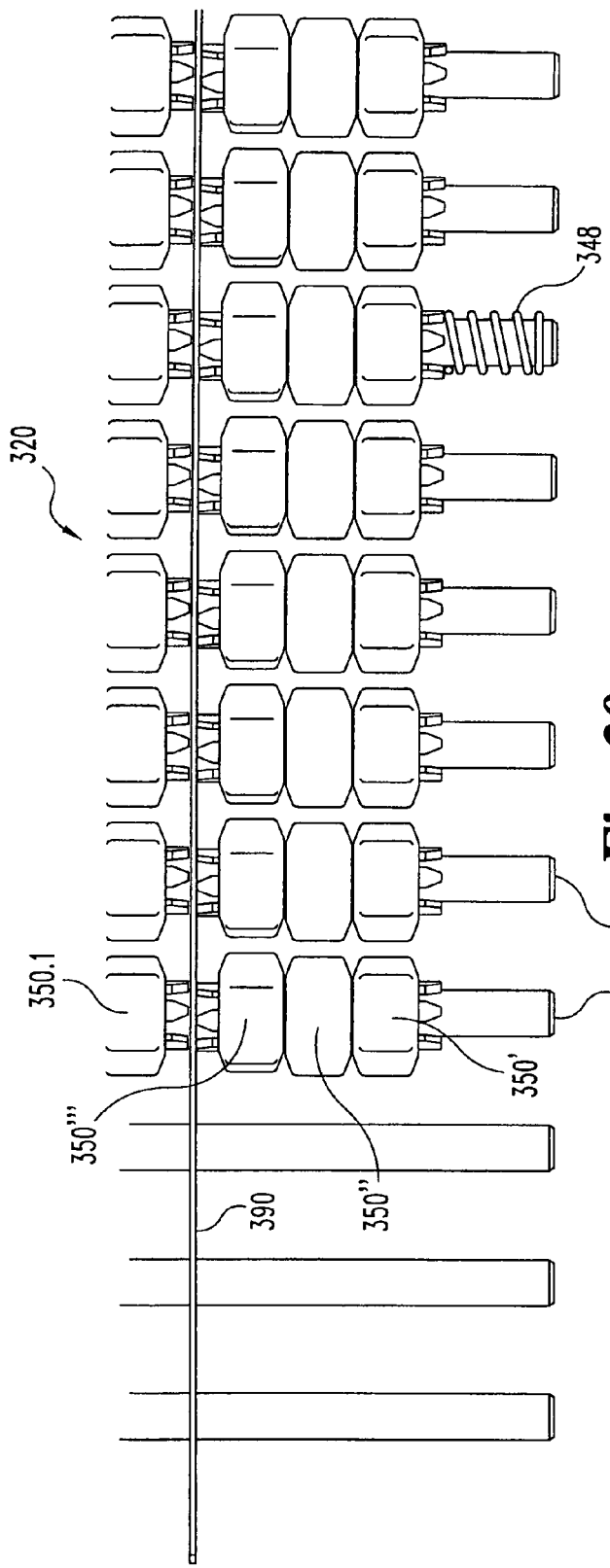
FIG. 20 is a top plan view of the apparatus of FIG. 19.

As best seen in FIG. 20, a coupled triplet of rollers 350', 350", and 350''' are locked together and rotatable on one side of static member 390. A second triplet of coupled rollers, with only roller 350.1 being depicted, is located on the other side of static member 390. These two coupled triplets of rollers rotate independently of each other.

FIG. 20 also shows a spring 348 which is placed between a side structure of conveyor 320 (not shown) and a side of a roller 350. Spring 348 biases the roller 350 away from the side of the conveyor. Preferably, another spring 348 is located on the opposite side of the same roller shaft, the two springs coacting to urge together the interlocked rollers. This spring-loaded clamping of adjacent rollers reduces the amount of slip relative to the shaft for the compressed rollers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for conveying a product, comprising:
    a plurality of roller shafts;
    a plurality of driven rollers supported by each said roller shaft, each said roller having an outer surface and a plurality of lobes placed circumferentially around the outer surface, each said lobe being at least partly non-circular, and a static member having a top surface and a length extending from between a first pair of said rollers of a first said shaft to between a second pair of said rollers of a second said shaft;

wherein said lobes support the product at a first vertical height, and the top surface of the static member is adapted and configured to support a portion of the product between a pair of said rollers at a second vertical height different than the first vertical height.

2. The apparatus of claim 1 wherein said rollers are slippable rollers slippably driven by the outer diameter of the corresponding said shaft.

3. The apparatus of claim 1 wherein the first vertical height is greater than the second vertical height and the difference between the first vertical height and the second vertical height is more than about one half of a millimeter and less than about two millimeters.

4. The apparatus of claim 1 wherein the first vertical height is greater than the second vertical height and the difference between the first vertical height and the second vertical height is more than about one half of a millimeter and less than about one and one-half millimeters.

5. The apparatus of claim 1 wherein said static member has a width and the width is greater than about one half of a millimeter and less than about two millimeters.

6. The apparatus of claim 1 wherein said static member is supported by a plurality of said roller shafts.

7. The apparatus of claim 6 wherein said static member includes a plurality of slots, each slot adapted and configured for receiving therein a different one of a corresponding plurality of said roller shafts, said corresponding shafts supporting said static member at said slots.

8. The apparatus of claim 1 which further comprises means for interlocking adjacent driven rollers, such that the lobes of one adjacent roller have a predetermined angular relationship to the lobes of the other adjacent roller.

9. The apparatus of claim 8 wherein said interlocking means establishes a single predetermined angular relationship between all the lobes of one adjacent roller to all the lobes of the other adjacent roller.

10. The apparatus of claim 8 wherein said first pair of rollers are not interlocked together and the second pair of rollers are not interlocked together.

11. The apparatus of claim 1 wherein the product is a paper product.

12. The apparatus of claim 1 wherein the product is a stack of paper products.

13. An apparatus for conveying a product, comprising:
a roller shaft having a smooth outer diameter; and
a plurality of rollers rotatably supported by said roller shaft, each said roller having an outer surface and a plurality of lobes placed circumferentially around the outer surface, each said lobe being at least partly non-circular, each said roller having an inner diameter adapted and configured for being slippably driven by said shaft.

14. The apparatus of claim 13 which further comprises means for coupling together said plurality of rollers such that said rollers rotate in unison.

15. The apparatus of claim 13 which further comprises a spring for biasing said rollers toward each other.

16. The apparatus of claim 13 wherein adjacent said rollers are in fixed relationship to each other such that there is a predetermined angular offset from a lobe of one said roller to a lobe of the adjacent said roller and the angular offset is more than about 14 degrees and less than about 56 degrees.

17. The apparatus of claim 16 wherein the angular offset is more than about 21 degrees and less than about 37 degrees.

18. The apparatus of claim 17 wherein the angular offset is more than about 24 degrees and less than about 32 degrees.

19. The apparatus of claim 13 wherein at least one side of each said roller includes a plurality of equally-spaced interlockable members, and the number of interlockable members is equal to the number of lobes.

20. The apparatus of claim 13 wherein each said roller has first and second sides spaced apart by said lobes with the first side being interlockable with the second side, and said shaft includes at least two adjacent rollers which are in fixed angular relationship to each other by interlocking of the first side of one said adjacent roller to the second side of the other said adjacent roller.

21. The apparatus of claim 13 wherein said roller shaft is a first roller shaft and said plurality of rollers is a first plurality and which further comprises a second roller shaft rotatably supporting a second plurality of rollers and a static member having a top surface and a length extending from between a first pair of said first plurality to between a second pair of said second plurality, and wherein said lobes support the product at a first vertical height, and the top surface of the static member is adapted and configured to support a portion of the product between the first pair of rollers and the second pair of roller at a second vertical height lower than the first vertical height.

22. The apparatus of claim 21 wherein the first vertical height is greater than the second vertical height and the difference between the first vertical height and the second vertical height is more than about one half of a millimeter and less than about two millimeters.

23. The apparatus of claim 22 wherein said static member has a width and the width is greater than about one half of a millimeter and less than about two millimeters.

24. The apparatus of claim 13 wherein the product is a paper product.

25. The apparatus of claim 13 wherein the product is a stack of paper products.

26. An apparatus for conveying a product, comprising:
a roller shaft having an outer diameter; and
a plurality of rollers supported by the outer diameter of said roller shaft, each said roller having an outer surface and a plurality of equally-spaced lobes placed circumferentially around the outer surface,
wherein adjacent said rollers are in fixed relationship to each other such that there is a predetermined angular offset from a lobe of one said roller to a lobe of the adjacent said roller and the angular offset is more than about 14 degrees and less than about 56 degrees.

27. The apparatus of claim 26 wherein the angular offset is more than about 21 degrees and less than about 37 degrees.

28. The apparatus of claim 26 wherein the angular offset is more than about 24 degrees and less than about 32 degrees.

29. The apparatus of claim 26 wherein at least one side of each said roller includes a plurality of equally-spaced interlockable members, and the number of interlockable members is equal to the number of lobes.

30. The apparatus of claim 29 wherein said shaft includes at least two adjacent rollers which are in fixed relationship to each other by interlocking of the interlockable members of one said adjacent roller to the interlockable members of the other said adjacent roller.

31. The apparatus of claim 26 wherein said roller shaft is a first roller shaft and said plurality of rollers is a first plurality and which further comprises a second roller shaft rotatably supporting a second plurality of rollers and a static member having a top surface and a length extending from between a first pair of said first plurality to between a second pair of said second plurality, and wherein said lobes support the product at a first vertical height, and the top surface of the static member is adapted and configured to support a portion of the product between the first pair of rollers and the second pair of roller at a second vertical height different than the first vertical height.

32. The apparatus of claim 31 wherein the first vertical height is greater than the second vertical height and the difference between the first vertical height and the second vertical height is more than about one half of a millimeter and less than about two millimeters.

33. The apparatus of claim 32 wherein said static member has a width and the width is greater than about one half of a millimeter and less than about two millimeters.

34. The apparatus of claim 26 wherein the product is a stack of paper products.

35. The apparatus of claim 26 wherein each of said rollers includes an inner diameter slippably supported by the outer diameter of said roller shaft.

36. The apparatus of claim 26 wherein each of the lobes are non-circular.

* * * * *